(12) United States Patent
Biskeborn et al.

(10) Patent No.: US 8,027,124 B2
(45) Date of Patent: Sep. 27, 2011

(54) MAGNETIC HEAD

(75) Inventors: Robert Glenn Biskeborn, Hollister, CA (US); Calvin Shyhjong Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 12/204,696

(22) Filed: Sep. 4, 2008

(65) Prior Publication Data

US 2010/0053810 A1 Mar. 4, 2010

(51) Int. Cl.
*G11B 5/29* (2006.01)
*G11B 5/23* (2006.01)
*G11B 15/60* (2006.01)

(52) U.S. Cl. .......... 360/121; 360/119.01; 360/129; 360/130.1; 360/130.2; 360/130.21; 360/130.3; 360/130.31

(58) Field of Classification Search .......... 360/119.01, 360/121, 129, 130.1, 130.2, 130.3, 130.21, 360/130.31
See application file for complete search history.

(56) References Cited

U.S. PATENT DOCUMENTS

| | | | |
|---|---|---|---|
| 6,222,698 B1 | 4/2001 | Barndt et al. | 360/76 |
| 7,054,093 B1 | 5/2006 | Anderson et al. | 360/75 |
| 7,342,738 B1 | 3/2008 | Anderson et al. | 360/77.12 |
| 7,393,066 B2 | 7/2008 | Dugas et al. | 360/77.14 |
| 7,414,811 B2 | 8/2008 | Biskeborn | 360/129 |
| 2007/0047142 A1* | 3/2007 | Biskeborn | 360/129 |

* cited by examiner

*Primary Examiner* — Ly D Pham
(74) *Attorney, Agent, or Firm* — Zilka-Kotab, PC

(57) ABSTRACT

A system in one embodiment includes first and second modules, each module having a substrate, a closure, and a gap situated therebetween, the gap comprising transducers selected from readers and writers; wherein the closures face each other, wherein the closure and the substrate of each module form a flat tape bearing surface, wherein a module spacing is defined as a distance from a point proximate to the transducers in the gap of the first module to a point proximate to the transducers in the gap of the second module, wherein the module spacing is less than 1.3 mm and greater than 0 mm.

20 Claims, 6 Drawing Sheets

MAGNETIC HEAD

BACKGROUND

The present invention relates to magnetic heads, and more particularly, this invention relates to a magnetic head permitting high tape speeds with reliable read verify function.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has lead to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. This movement generally entrains a film of air between the head and tape. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect efficient signal transfer, and so that the read element is in near contact with the tape to provide effective coupling of the magnetic field from the tape to the read element.

Also important for reliable data recording is proper alignment of a writer and trailing reader used in a read-while-write data verify operation. As will soon become apparent, such misregistration, which may be caused by transient tape skewing, adversely affects the integrity of the read verify process.

Moreover, many skilled in the art have attempted to achieve the performance and reliability of the disclosed embodiments through routine and even extreme experimentation, but have never been able to achieve such results.

Further, conventional wisdom dictates that a system as disclosed herein would not work due to tape stiffness causing the tape to fly over the trailing module. However, working contrary to conventional wisdom, the inventors have achieved what was previously though impossible.

SUMMARY

A system in one embodiment includes first and second modules, each module having a substrate, a closure, and a gap situated therebetween, the gap comprising transducers selected from readers and writers; wherein the closures face each other, wherein the closure and the substrate of each module form a flat tape bearing surface, wherein a module spacing is defined as a distance from a point proximate to the transducers in the gap of the first module to a point proximate to the transducers in the gap of the second module, wherein the module spacing is less than 1.3 mm and greater than 0 mm.

A system in another embodiment includes a first module having a substrate, a closure, and a gap situated therebetween, the gap comprising at least writers; and a second module having a substrate, a closure, and a gap situated therebetween, the gap comprising at least readers aligned with the writers of the first module in a direction of tape travel thereacross for reading data tracks written by the writers; wherein the closures face each other, wherein the closure and the substrate of each module form a flat tape bearing surface, wherein a module spacing is defined as a distance from a point proximate to the transducers in the gap of the first module to a point proximate to the transducers in the gap of the second module, wherein the module spacing is less than 1.3 mm and greater than 0.5 mm, wherein an internal wrap angle of each module is defined between a plane extending along the tape bearing surface thereof and the tape extending between the modules, wherein the internal wrap angle is between about 0.3 degree and about 1.0 degree, wherein a length of each closure as measured parallel to a direction of tape travel thereacross is greater than a length of a tent of a tape passing thereover measured in the same direction.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof.

In one general embodiment, a system includes first and second modules, each module having a substrate, a closure, and a gap situated therebetween, the gap comprising transducers selected from readers and writers; wherein the closures face each other, wherein the closure and the substrate of each module form a flat tape bearing surface, wherein a module spacing is defined as a distance from a point proximate to the transducers in the gap of the first module to a point proximate to the transducers in the gap of the second module, wherein the module spacing is less than 1.3 mm and greater than 0 mm.

In another general embodiment, a system includes a first module having a substrate, a closure, and a gap situated therebetween, the gap comprising at least writers; and a second module having a substrate, a closure, and a gap situated therebetween, the gap comprising at least readers aligned with the writers of the first module in a direction of tape travel thereacross for reading data tracks written by the writers; wherein the closures face each other, wherein the closure and the substrate of each module form a flat tape bearing surface, wherein a module spacing is defined as a distance from a point proximate to the transducers in the gap of the first module to a point proximate to the transducers in the gap of the second module, wherein the module spacing is less than 1.3 mm and greater than 0.5 mm, wherein an internal wrap angle of each module is defined between a plane extending along the tape bearing surface thereof and the tape extending between the modules, wherein the internal wrap angle is between about 0.3 degree and about 1.0 degree, wherein a length of each closure as measured parallel to a direction of tape travel thereacross is greater than a length of a tent of a tape passing thereover measured in the same direction.

Figure 1:
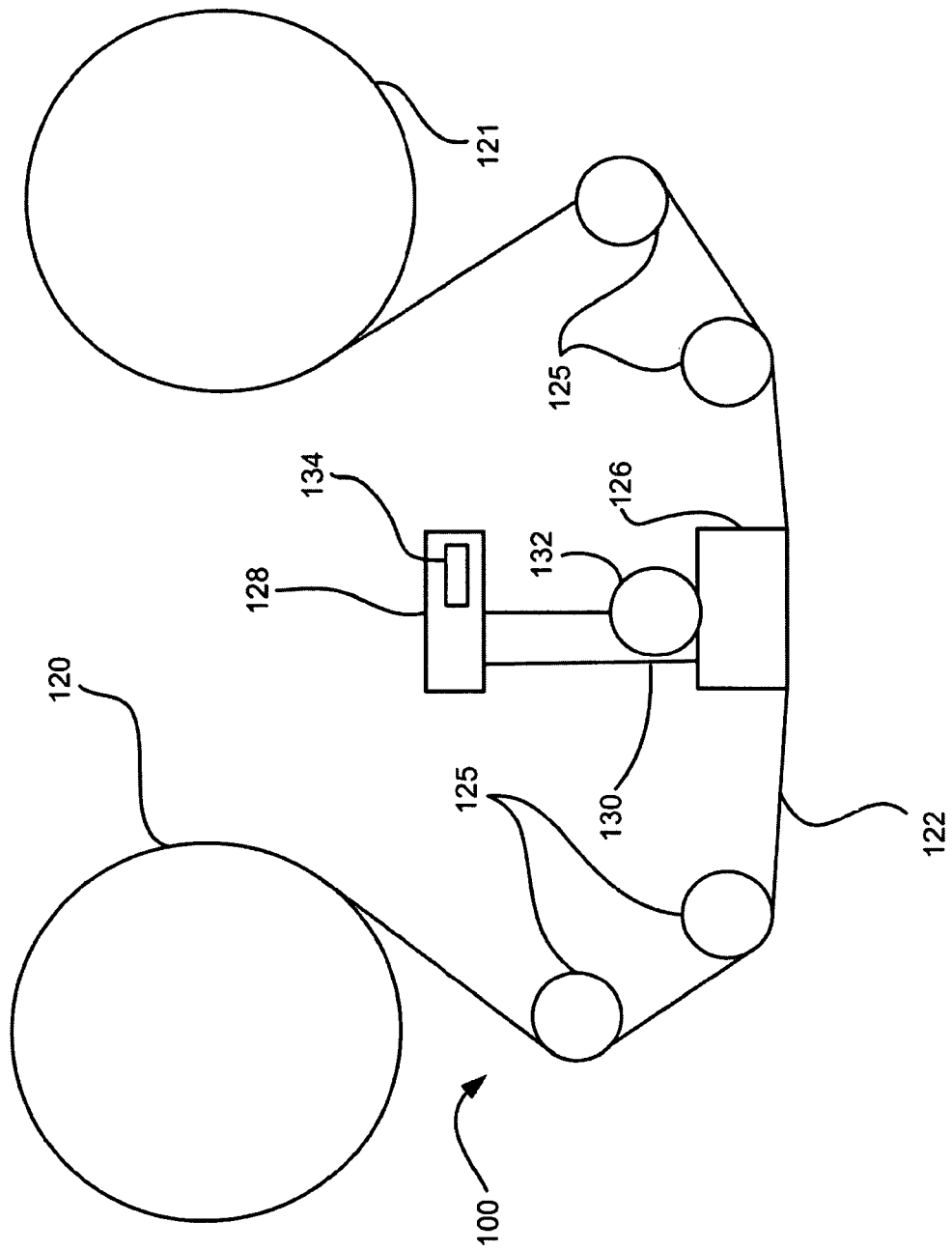
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

Figure 2:
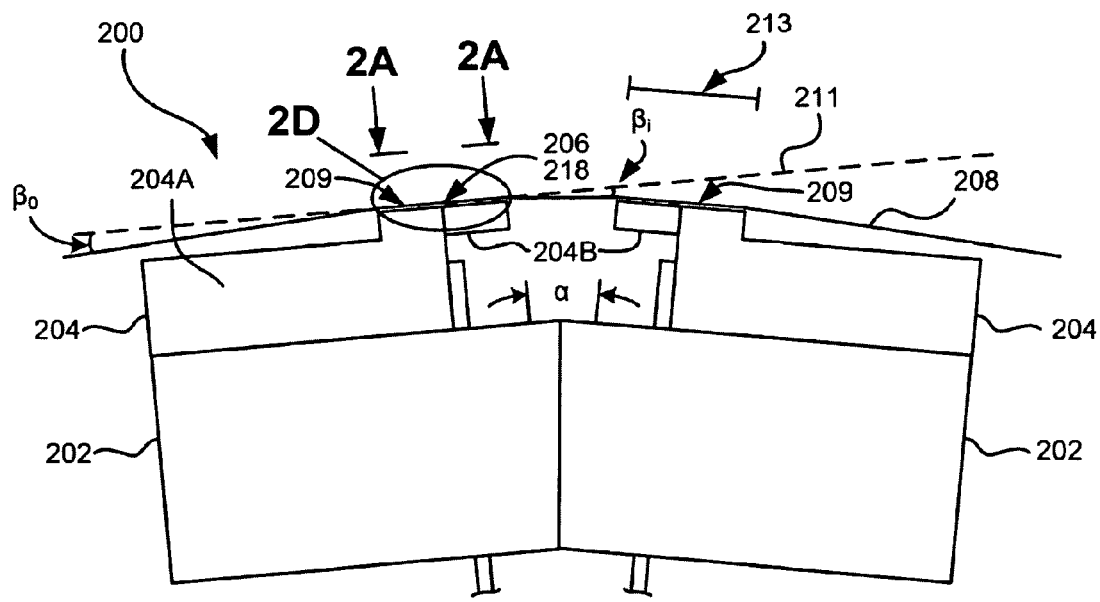
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with a gap 218 comprising elements 206 such as readers and/or writers situated therebetween. In use, a tape 208 is moved over the modules 204 along a media (tape) bearing surface 209 in the manner shown for reading and writing data on the tape 208 using the readers and writers. The wrap angles $\beta_i$, $\beta_o$ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo readers.

Figure 2A:
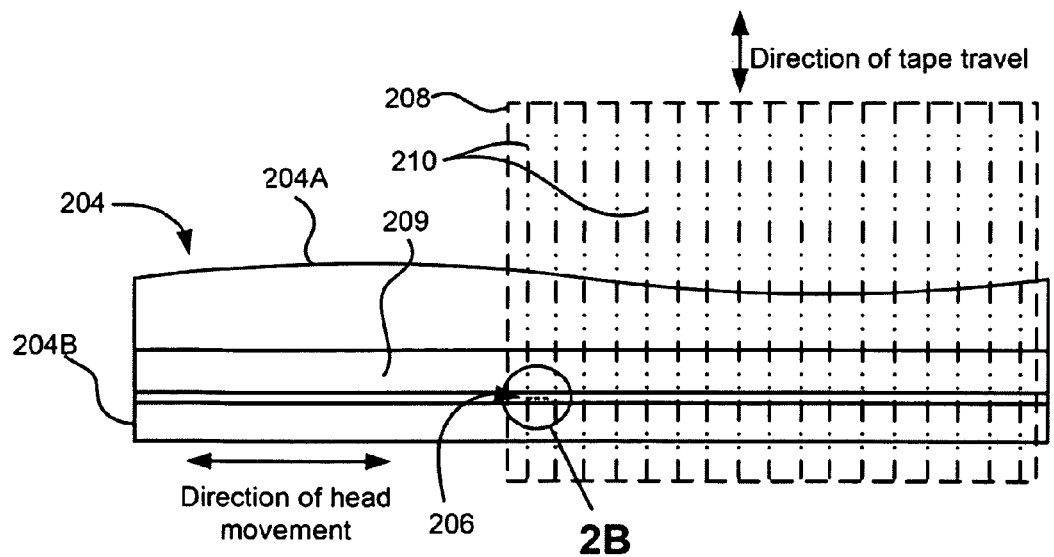
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4-22 data bands, e.g., with 16 data bands and 17 servo tracks 210, as shown in FIG. 2A on a one-half inch wide tape 208. The data bands are defined between servo tracks 210. Each data band may include a number of data tracks, for example 96 data tracks (not shown). During read/write operations, the elements 206 are positioned within one of the data bands. Outer readers, sometimes called servo readers, read the servo tracks 210. The servo signals are in turn used to keep the elements 206 aligned with a particular track during the read/write operations.

Figure 2B:
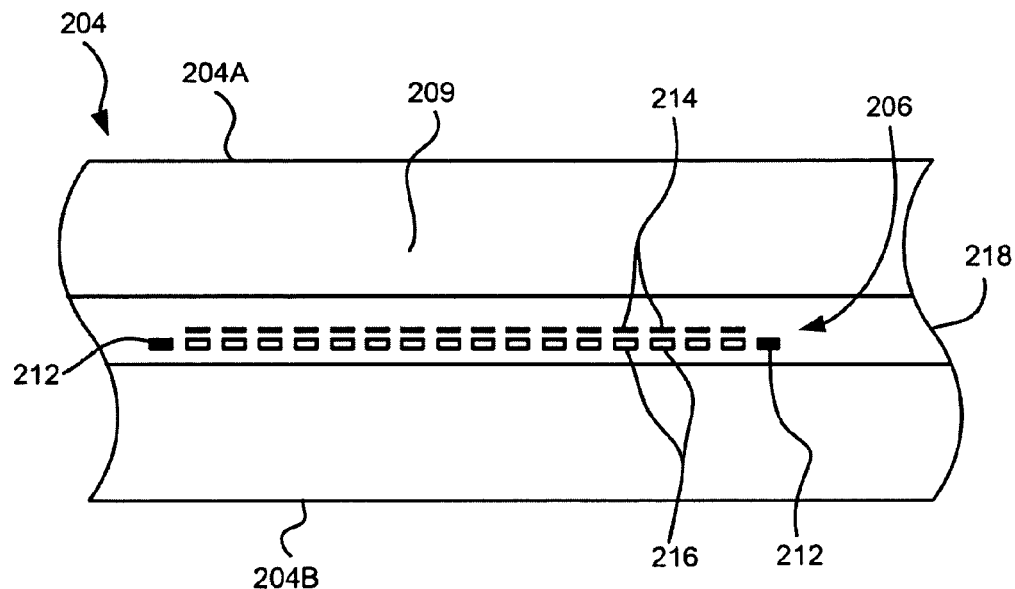
FIG. 2B is a detailed view taken from Circle 2B of FIG. 2A.

FIG. 2B depicts a plurality of read and/or write elements 206 formed in a gap 218 on the module 204 in Circle 2B of FIG. 2A. As shown, the array of elements 206 includes, for example, 16 writers 214, 16 readers 216 and two servo readers 212, though the number of elements may vary. Illustrative embodiments include 8, 16, 32, and 64 elements per array 206. A preferred embodiment includes 32 readers per array and/or 32 writers per array. This allows the tape to travel more slowly, thereby reducing speed-induced tracking and mechanical difficulties. While the readers and writers may be arranged in a piggyback configuration as shown in FIG. 2B, the readers 216 and writers 214 may also be arranged in an interleaved configuration. Alternatively, each array of elements 206 may be readers or writers only, and the arrays may contain one or more servo readers 212. As noted by considering FIGS. 2 and 2A-B together, each module 204 may include a complementary set of elements 206 for such things as bi-directional reading and writing, read-while-write capability, backward compatibility, etc.

Figure 2C:
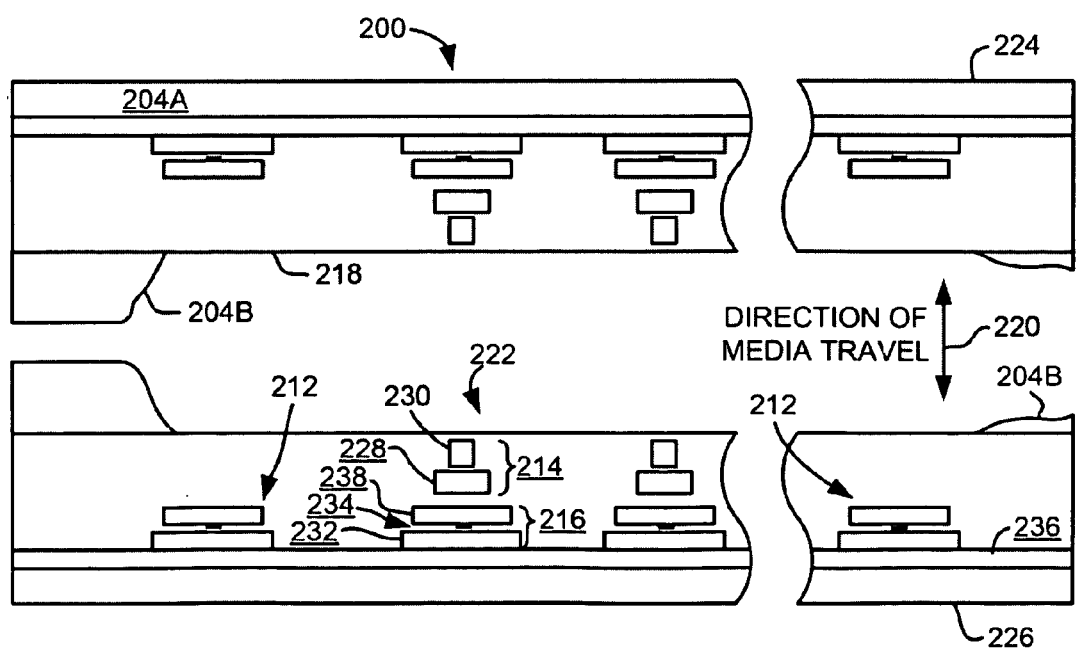
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction. Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Two common parameters are associated with heads of such design as in FIG. 2. One parameter includes the tape wrap angles $\beta_i$, $\beta_o$ defined between the tape 208 and a plane 211 in which the upper surface of the tape bearing surface 209 resides. It should be noted that the tape wrap angles $\beta_i$, $\beta_o$ include an inner wrap angle $\beta_i$ which is often similar in degree to an external, or outer, wrap angle $\beta_o$. The tape bearing surfaces 209 of the modules 204 are set at a predetermined angle $\alpha$ from each other such that the desired inner wrap angle $\beta_i$ is achieved at the facing edges. Moreover, a tape bearing surface length 213 is defined as the distance (in the direction of tape travel) between edges of the tape bearing surface 209. The wrap angles $\beta_i$, $\beta_o$ and tape bearing surface length 213 are often adjusted to deal with various operational aspects of heads such as that of FIG. 2, in a manner that will soon become apparent.

Figure 2D:
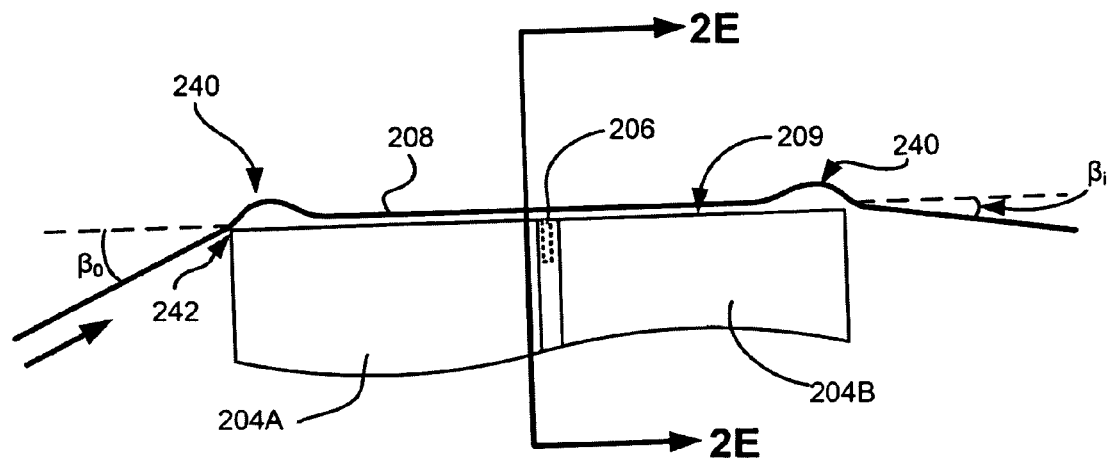
FIG. 2D is an enlarged view of Circle 2D of FIG. 2, showing a first and second known effect associated with the use of the head of FIG. 2.

During use of the head of FIG. 2, various effects traditionally occur. FIG. 2D is an enlarged view of the area encircled in FIG. 2. FIG. 2D illustrates a first known effect associated with the use of the head 200 of FIG. 2. When the tape 208 moves across the head as shown, air is skived from below the tape 208 by a skiving edge 242 of the substrate 204A, and instead of the tape 208 lifting from the tape bearing surface 209 of the module (as intuitively it should), the reduced air pressure in the area between the tape 208 and the tape bearing surface 209 allows atmospheric pressure to urge the tape towards the tape bearing surface 209.

To obtain this desirable effect, the wrap angle $\beta_o$ is carefully selected. An illustrative wrap angle is about 0.9°±0.2. Note, however, that any wrap angle greater than 0° results in tents 240 being formed in the tape 208 on opposite edges of the tape bearing surface 209. This effect is a function of tape stiffness and tension. For given geometrical wrap angles for example, stiffer tapes will have larger tents 240.

If the wrap angle $\beta_i$, $\beta_o$ is too high, the tape 208 will tend to lift from the tape bearing surface 209 in spite of the vacuum. The larger the wrap angle, the larger the tent 240, and consequently the more air is allowed to enter between the tape bearing surface 209 and tape 208. Ultimately, the forces (atmospheric pressure) urging the tape 208 towards the tape bearing surface 209 are overcome and the tape 208 becomes detached from the tape bearing surface 209.

Figure 2E:
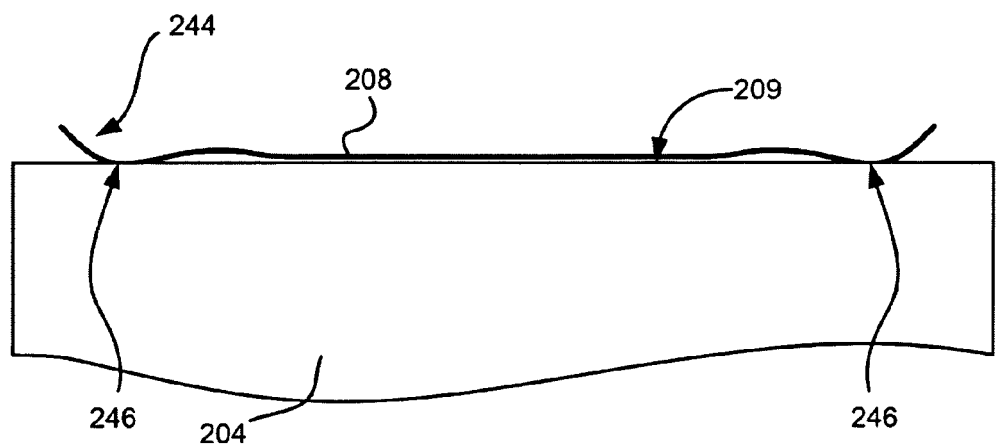
FIG. 2E is a cross-sectional view taken along Line 2E of FIG. 2D, showing a third known effect associated with the use of the head of FIG. 2.

Now referring to FIG. 2E, if the wrap angle $\beta_i$, $\beta_o$ is too small, the tape tends to exhibit tape lifting 244, or curling, along the side edge of the tape bearing surface 209 as a result of air leaking in at the edges and tape mechanical effects. Specifically, the edges of the tape 208 may curl away from the tape bearing surface 209, resulting in edge loss or increased spacing between the edges of the tape 208 and the tape bearing surface 209. This effect is undesirable, as data cannot reliably be written to the edges of a tape 208 in a system subject to edge loss.

Additionally, the tape lifting 244 results in additional stress at points 246 which, in turn, may cause additional wear. Further augmenting effects such as tape lifting 244 is the fact that the tape 208 naturally has upturned edges due to widespread use of technology applied in the video tape arts.

The external wrap angles $\beta_o$ may be set in the drive, such as by eccentric rollers. The offset axis creates an orbital arc of rotation, allowing precise alignment of the wrap angle $\beta_o$. Alternatively, outriggers of a type known in the art may be used to set the external wrap angles $\beta_o$.

Figure 3A:
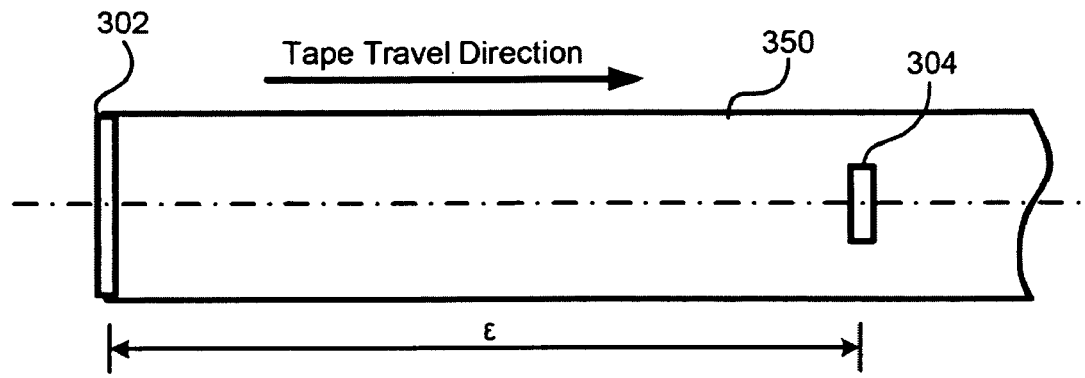
FIG. 3A is a schematic diagram of a tape running over a writer/reader combination in normal operation.
Figure 3B:
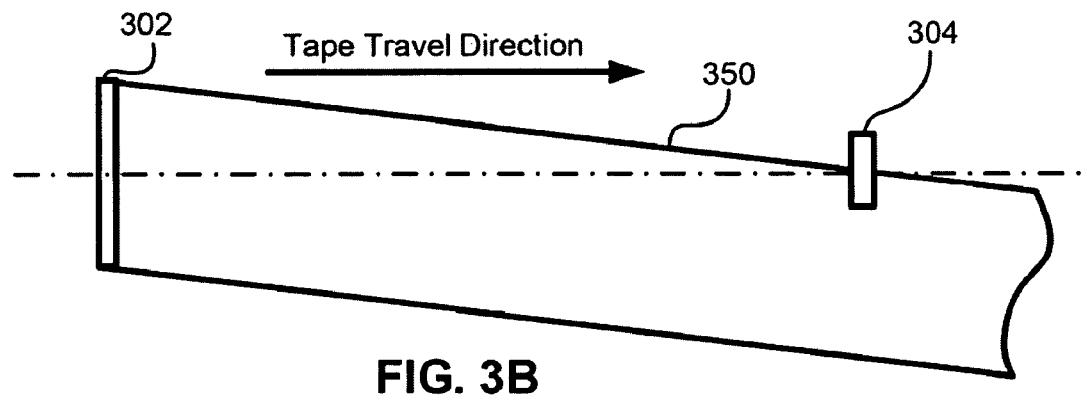
FIG. 3B is a schematic diagram of a tape running over a writer/reader combination where the tape has skewed.
Figure 4A:
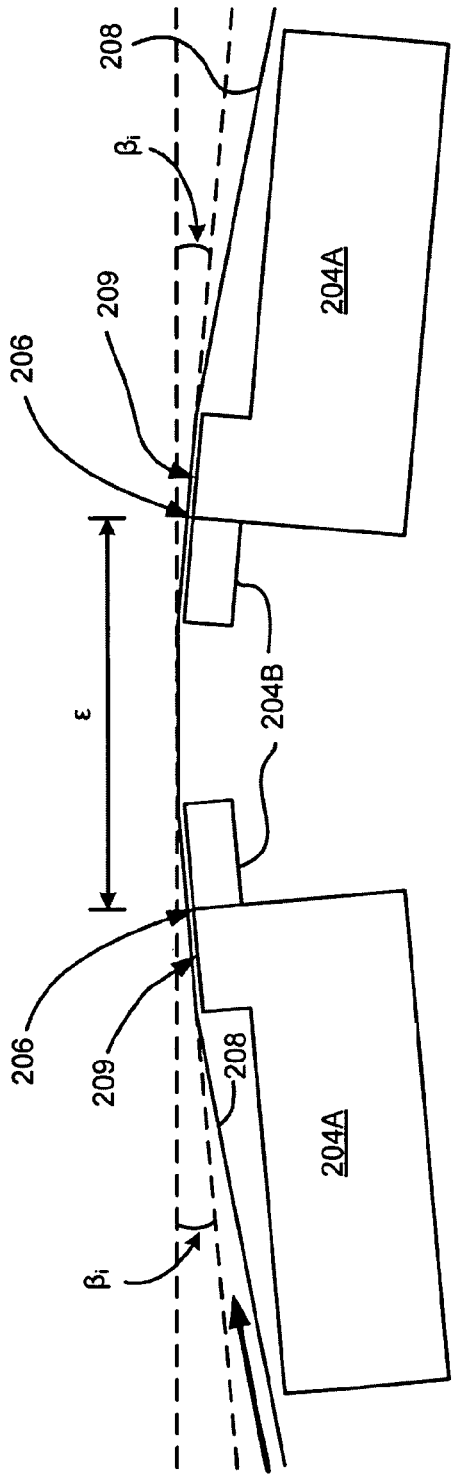
FIG. 4A illustrates a close-up side view of a two-module magnetic tape head with a longer module to module distance and more tape wrap angle according to one embodiment.
Figure 4B:
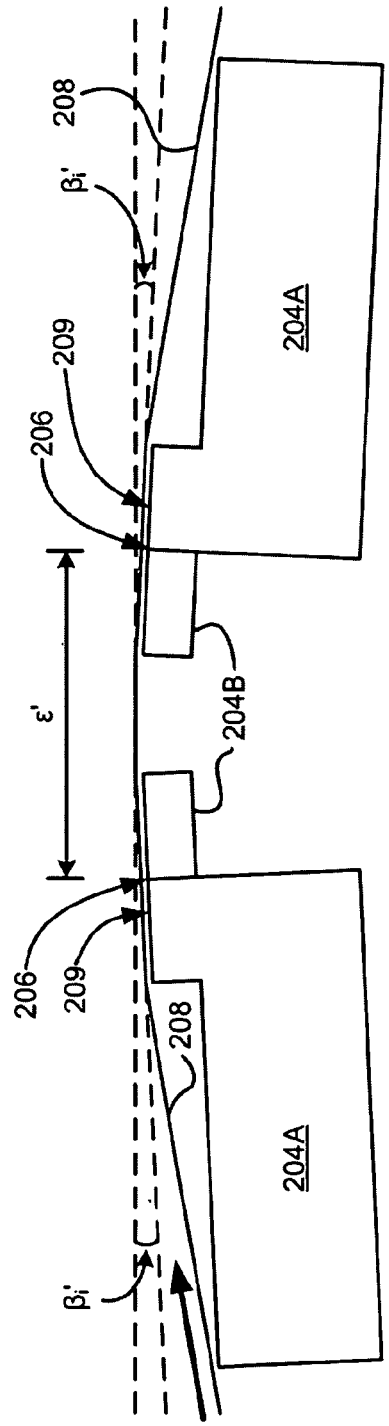
FIG. 4B illustrates a close-up side view of a two-module magnetic tape head with a shorter module to module distance and less tape wrap angle according to one embodiment.

Now referring to FIGS. 4A and 4B, a portion of a two-module magnetic tape head is shown, focusing on the substrate 204A and closure 204B orientation with respect to the tape bearing surface 209. The spatial relationship between the two modules is adapted to compensate for loss of the "read verify margin." The "read verify margin" can be described with reference to FIGS. 3A-3B.

In FIGS. 3A-3B, a data track 350 is shown being written to a tape by a writer 302, which may be included in the gap 218, shown in FIG. 4A. The tape, after having the track 350 written thereon, travels in the direction of the Tape Travel Direction arrow, and passes over a reader 304. Commonly, after tracks are written to a tape, they are verified with a reader 304, so that if tracks are not written properly, they can be corrected.

In FIG. 3A, the tape is travelling properly, allowing the track 350 to be read by the reader 304 after it is written by the writer 302.

In FIG. 3B, one problem encountered in magnetic tape manufacturing is shown, where the tape skews in a direction perpendicular to tape travel, as indicated by the Tape Travel Direction arrow. This causes only a portion of the data reader 304 to be covered by the written data track 350, resulting in inconsistent verification of the track. This means that even if the track 350 is properly written by the writer 302, the reader 304 is not able to properly verify that it is written properly since track 350 does not entirely cover the reader 304. A more serious problem may occur where the tape has skewed so severely that the track 350 does not pass over the reader 304 at all, resulting in none of the written tracks being verified by the reader 304. This results in the device indicating that a faulty writer 302 has not properly written tracks, even if the tracks are written properly. For a give tape skewing, this effect is more pronounced the greater the distance is between the reader 304 and writer 302.

Figure 3C:
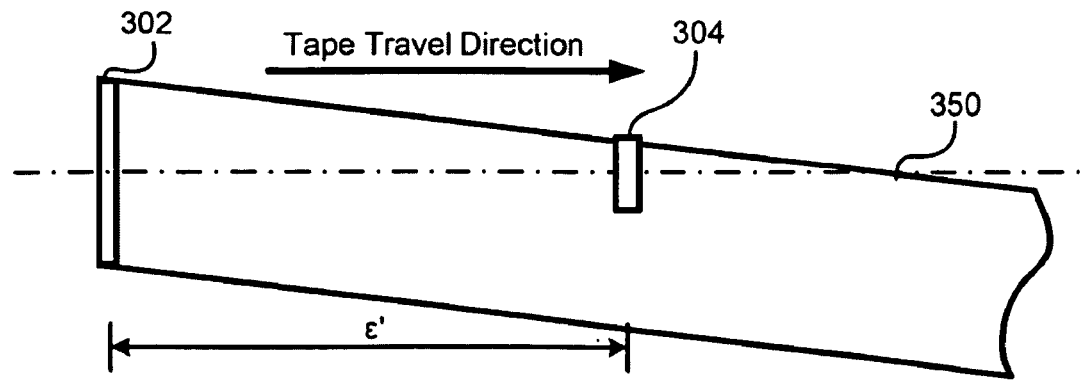
FIG. 3C is a schematic diagram of a tape running over a writer/reader combination according to one embodiment where the tape has skewed.

FIG. 3C illustrates one embodiment of the present invention, in which a gap to gap spacing of $\epsilon'$ effectively eliminates the problem encountered in FIG. 3B. As shown, the trailing reader 304 is above the data track being written. Now referring to FIGS. 4A and 4B, the distance between the modules $\epsilon$ is set, along with the tape wrap angle $\beta_i$, to minimize this tape skewing effect according to one embodiment. The distance $\epsilon$ between read and write portions of the head is set to accommodate a given tape 208 skewing angle deviation. In other words, as the tape 208 runs across the tape bearing surface 209, it skews in a direction perpendicular to the tape travelling direction, indicated by the arrow in FIG. 4A.

In one embodiment, with reference to FIG. 4B, the distance $\epsilon'$ between read and write portions of the head is less than about 1.3 mm, preferably about 1.2 mm. As can be seen in FIG. 4B when compared to FIG. 4A, the distance between the modules $\epsilon'$ is less in FIG. 4B than in FIG. 4A. It is to be appreciated that this distance between the modules $\epsilon'$ is generally less than is possible in prior art head configurations, where the distance between the modules $\epsilon$ is commonly 1.5 mm or greater, as shown in FIG. 4A.

In one embodiment, a flat profile tape head having facing closures enables this capability. Note that conventional prior art tape heads having facing substrates are not so enabled, as the substrates generally interfere and do not provide the clearance necessary to reduce the distance $\epsilon'$ between read and write portions of the head to the distances recited herein.

Reducing the distance $\epsilon'$ between the read and write portions individually does not completely correct the problems associated with prior art tape heads, and does not ensure that performance will remain unaffected. Characteristics of the tape 208, such as tape bending stiffness, influence the effective internal wrap angle $\beta_i$ as the distance $\epsilon'$ between modules is reduced. Accordingly, as shown in FIG. 4B, the maximum permitted wrap angle $\beta_i'$, according to one embodiment, is about 0.8 degrees or less, compared to 2.0 degrees commonly used in prior art tape heads, as shown in FIG. 4A.

While this change in wrap angle $\beta_i'$ may appear subtle, changes discovered by the inventors surprisingly enable much smaller read verify margins than in prior art tape heads. In addition, the disclosed features enable better control of the head-tape spacing. Decreasing the distance $\epsilon$ between modules and specific tape free span length between the modules may be combined for better suppressing tape resonance and fluctuation effects. Furthermore, the length of the free span may be adjusted according to a specific tape thickness or tape modulus.

Furthermore, the features of the disclosed tape head enable higher speed tape operation than in prior art tape heads, such as tape speed of 8.5 meters/second, which is substantially higher than the range for conventional and prior art tape heads. Further, the tape head disclosed herein produces a relatively low surface stress head-tape interface, which is particularly well suited to operation with Giant Magnetoresistance (GMR) read sensor technology.

Referring again to FIG. 2, according to one particularly preferred embodiment, a system 200 comprises first and second modules 202, each module having a substrate 204A, a closure 204B, and a gap 218 situated therebetween, the gap 218 comprising at least one of readers and writers. Readers and writers may employ any type of magnetoresistance sensors, such as anisotropic magnetoresistance (AMR), giant magnetoresistance (GMR), tunneling magnetoresistance (TMR), and colossal magnetoresistance (CMR) sensors. Each of the closures 204B face each other, and the closure 204B and the substrate 204A of each module 202 form a flat tape bearing surface 209, wherein a module spacing is defined as a distance from a point proximate to the transducers in the gap of the first module to a point proximate to the transducers in the gap of the second module. In addition, the module spacing is less than about 1.3 mm. and greater than 0 mm.

In other embodiments, the module spacing may be greater than about 0.5 mm., or may be between about 0.5 mm. and about 1.3 mm.

In another embodiment, the module spacing may be equal to or less than about ¼ of a write width divided by a tangent of a maximum tape skew angle defined as an angle between a line crossing through counterpoints of the writer on the first module and the reader on the second module and a line parallel to an edge of a track written on a tape at maximum skew. The maximum skew is system-dependent, and is generally calculated according to system design parameters.

In yet another embodiment, an internal wrap angle $\beta_i'$ of each module is defined between a plane (shown as line 211) extending along the tape bearing surface 209 thereof and the tape 208 extending between the modules, wherein the internal wrap angle $\beta_i'$ may be about 0.8 degree or less. In another embodiment, the internal wrap angle $\beta_i'$ may be between about 0.3 degree and about 1.0 degree.

In a further embodiment, a length of each closure 204B as measured parallel to a direction of tape travel thereacross may be greater than a length of the tent of a tape passing thereover measured in the same direction, or may be between about 200 microns and about 300 microns. This addresses the greater tenting of the tape resulting from the closer gap to gap spacing and enables minimizing the spacing losses near the elements. The closures preferably have the same lengths, but may have different lengths.

In another approach, a drive mechanism for passing a magnetic recording tape over the modules is included, along with a controller in communication with the modules.

In further embodiments, additional modules may also be present. The additional module or modules are generally positioned relative to an adjacent module according to the teachings and parameters herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
first and second modules, each module having a substrate, a closure, and a gap situated therebetween, the gap comprising transducers selected from readers and writers;
wherein the closures face each other,
wherein the closure and the substrate of each module form a flat tape bearing surface,
wherein a module spacing is defined as a distance from a point proximate to the transducers in the gap of the first module to a point proximate to the transducers in the gap of the second module, wherein the module spacing is less than 1.3 mm and greater than 0 mm, wherein an internal wrap angle of each module is defined between a plane extending along the tape bearing surface thereof and the tape extending between the modules, wherein the internal wrap angle is about 0.8 degrees or less.

2. A system as recited in claim 1, wherein the module spacing is greater than about 0.5 mm.

3. A system as recited in claim 1, wherein the module spacing is between 0.5 mm and 1.3 mm.

4. A system as recited in claim 1, wherein a length of each closure as measured parallel to a direction of tape travel thereacross is greater than a length of a tent of a tape passing thereover measured in the same direction.

5. A system as recited in claim 1, wherein at least one of the modules includes readers comprising AMR sensors.

6. A system as recited in claim 1, wherein at least one of the modules includes readers comprising GMR sensors.

7. A system as recited in claim 1, wherein at least one of the modules includes readers comprising TMR sensors.

8. A system as recited in claim 1, further comprising a third module.

9. A system as recited in claim 1, further comprising:
a drive mechanism for passing a magnetic recording tape over the modules; and
a controller in communication with the modules.

10. A system, comprising:
first and second modules, each module having a substrate, a closure, and a gap situated therebetween, the gap comprising transducers selected from readers and writers;
wherein the closures face each other,
wherein the closure and the substrate of each module form a flat tape bearing surface,
wherein a module spacing is defined as a distance from a point proximate to the transducers in the gap of the first module to a point proximate to the transducers in the gap of the second module,
wherein the module spacing is less than 1.3 mm and greater than 0 mm,
wherein the module spacing is not greater than about ¼ of a write width divided by a tangent of a maximum tape skew angle defined as an angle between a line crossing through counterpoints of the writer on the first module and the reader on the second module and a line parallel to an edge of a track written on a tape at maximum skew.

11. A system as recited in claim 10, wherein an internal wrap angle of each module is defined between a plane extending along the tape bearing surface thereof and the tape extending between the modules, wherein the internal wrap angle of each module is between about 0.3 degree and about 1.0 degree.

12. A system, comprising:
first and second modules, each module having a substrate, a closure, and a gap situated therebetween, the gap comprising transducers selected from readers and writers;
wherein the closures face each other,
wherein the closure and the substrate of each module form a flat tape bearing surface, wherein a module spacing is defined as a distance from a point proximate to the transducers in the gap of the first module to a point proximate to the transducers in the gap of the second module,
wherein the module spacing is less than 1.3 mm and greater than 0 mm,
wherein a length of each closure as measured parallel to a direction of tape travel thereacross is between about 200 and about 300 microns.

13. A system as recited in claim 12, wherein an internal wrap angle of each module is defined between a plane extending along the tape bearing surface thereof and the tape extending between the modules, wherein the internal wrap angle of each module is between about 0.3 degree and about 1.0 degree.

14. A system, comprising:
a first module having a substrate, a closure, and a gap situated therebetween, the gap comprising at least writers;
a second module having a substrate, a closure, and a gap situated therebetween, the gap comprising at least readers aligned with the writers of the first module in a direction of tape travel thereacross for reading data tracks written by the writers;
wherein the closures face each other,
wherein the closure and the substrate of each module form a flat tape bearing surface,
wherein a module spacing is defined as a distance from a point proximate to the transducers in the gap of the first module to a point proximate to the transducers in the gap of the second module,
wherein the module spacing is less than 1.3 mm and greater than 0.5 mm,
wherein an internal wrap angle of each module is defined between a plane extending along the tape bearing surface thereof and the tape extending between the modules, wherein the internal wrap angle is between about 0.3 degree and about 1.0 degree,
wherein a length of each closure as measured parallel to a direction of tape travel thereacross is greater than a length of a tent of a tape passing thereover measured in the same direction.

15. A system as recited in claim 14, wherein the module spacing is not greater than about ¼ of a write width divided by a tangent of a maximum tape skew angle defined as an angle between a line crossing through counterpoints of the writer on the first module and the reader on the second module and a line parallel to an edge of a track written on a tape at maximum skew.

16. A system as recited in claim 14, wherein the length of each closure is between about 200 and about 300 microns.

17. A system as recited in claim 14, wherein at least one of the modules includes readers comprising AMR sensors.

18. A system as recited in claim 14, wherein at least one of the modules includes readers comprising GMR sensors.

19. A system as recited in claim 14, wherein at least one of the modules includes readers comprising TMR sensors.

20. A system as recited in claim 14, further comprising:
a drive mechanism for passing a magnetic recording tape over the modules; and
a controller in communication with the modules.

* * * * *